United States Patent Office 3,250,715
Patented May 10, 1966

3,250,715
TERPOLYMER PRODUCT AND LUBRICATING COMPOSITION CONTAINING IT
Donald P. Wyman, Rochester, Pa., assignor to The Lubrizol Corporation, Wickliffe, Ohio, a corporation of Ohio
No Drawing. Filed Feb. 4, 1964, Ser. No. 342,546
14 Claims. (Cl. 252—56)

This invention relates to novel chemical compositions. More particularly, the invention is directed to terpolymers of dialkyl fumarates, vinyl esters of fatty acids, and alkyl vinyl ethers. It relates further to novel lubricating compositions comprising these novel chemical compositions which possess low pour points and other advantageous characteristics as lubricants.

A good engine lubricating oil is one that will not thicken excessively at low temperatures or thin out excessively at elevated temperatures. The viscosity index is a measure of this viscosity-temperature relationship wherein a low value indicates relatively poor resistance to viscosity change with temperature, while high values indicate optimum resistance. While viscosity is the important limitation in low temperature engine starting, the pour point of the oil is also a factor since oils having low pour points will flow to the pump intake, and oil circulation will be maintained throughout the engine once it has been started. Thus, a lubricating oil having the proper viscosity and a low pour point will reduce engine damage from lack of oil flow to and from the circulating pump. Polymers and copolymers have been suggested in the art as additives which are useful for depressing the pour point of various lubricating oils. However, many of the suggested polymers and copolymers are unsatisfactory; for example, some are oil insoluble while others depress the pour point to such a limited degree or change the viscosity characteristics to such a degree as to make these additives undesirable. Terpolymers which have also been suggested as pour point depressants also suffer these disadvantages. For example, the terpolymer prepared by polymerization of an alpha, beta-unsaturated polycarboxylic acid, an alkyl vinyl ether, and a vinyl ester followed by esterification of the terpolymer with an alcohol is only somewhat effective as a pour point depressant.

Accordingly, it is an object of this invention to provide novel compositions of matter, viz., terpolymers of dialkyl fumarates, vinyl esters of fatty acids, and alkyl vinyl ethers.

It is also an object of this invention to provide novel compositions of matter which are oil soluble.

It is another object of this invention to provide novel lubricating oil compositions having lower pour points and higher viscosity indices.

These and other objects are achieved in accordance with this invention by providing a terpolymer having a specific viscosity of from about 0.090 to 0.800 measured in a solution of 5 grams of terpolymer per 100 mls. of benzene at 30° C., prepared by the process of polymerizing at a temperature of from about 25° to 150° C., a mixture of
 (A) 1 mole of a dialkyl fumarate wherein the alkyl radicals contain from about 10 to 18 carbon atoms, and from about 0.5 to 1 mole of a mixture of
 (B) A vinyl ester of a fatty acid having from about 2 to 10 carbon atoms, and
 (C) An alkyl vinyl ether wherein the alkyl group contains from about 1 to 10 carbon atoms, the mole ratio of (B) to (C) in the mixture being within the range of from about 9:1 to 1:9.

The dialkyl fumarates which are useful in the preparation of the terpolymers of this invention are easily obtained by the esterification of fumaric acid with an alcohol containing from about 10 to 18 carbon atoms. The usual esterification conditions are employed. However, any of the common methods of producing the desired esters (e.g., ester interchange) may be employed since the method of preparing the esters is not critical.

As mentioned previously, the alcohols which are useful in the preparation of the dialkyl fumarates are those having from 10 to 18 carbon atoms such as decyl ($C_{10}$), dodecyl ($C_{12}$), tetradecyl ($C_{14}$), hexadecyl ($C_{17}$), and octadecyl ($C_{18}$) alcohol. In addition to the individual alcohols, mixtures of two or more alcohols having an average number of carbon atoms ranging from about 10 to 18 carbon atoms and preferably averaging from about 12 to 14 carbon atoms may also be employed in the preparation of the dialkyl fumarate. Suitable commercially available mixed alcohols are those obtained by the hydrogenation of natural oils such as cocoanut oil and tallow. One of the preferred commercially available alcohol mixtures consists of 2% decyl alcohol, 65% dodecyl alcohol, 26% tetradecyl alcohol, and 7% hexadecyl alcohol. Alcohols or alcohol mixtures containing an average from 12 to 14 carbon atoms are especially preferred since the terpolymers obtained from dialkyl fumarates containing from 12 to 14 carbon atoms in the alkyl group possess superior oil solubility and pour point depressing characteristics.

The second reactant which is utilized in the preparation of the terpolymers of this invention is a vinyl ester of a fatty acid having from about 2 to 10 carbon atoms. Examples of such vinyl esters include vinyl acetate, vinyl butyrate, vinyl hexanoate, and vinyl octanoate. Although any of the above esters may be utilized, vinyl acetate is preferred.

The third reactant which is utilized in the preparation of the terpolymers of this invention is an alkyl vinyl ether wherein the alkyl group contains from about 1 to 10 carbon atoms. Examples of such vinyl ethers include methyl vinyl ether, ethyl vinyl ether, iso-butyl vinyl ether, and n-butyl vinyl ether. Ethyl vinyl ether is especially preferred.

In general, from about 0.5 to about 1 mole of a mixture of the vinyl ester of (B) and the alkyl vinyl ether of (C) will be utilized per mole of the dialkyl fumarate of (A) in the monomer mixture. The preferred molar ratio of (A) to the mixture of (B) and (C) is 1:1 since the terpolymers obtained from such a mixture are characterized by superior oil solubility. The molar ratio of vinyl ester (B) to alkyl vinyl ether (C) may vary within the range of from about 9:1 to 1:9. The preferred range is from about 4:1 to 1:4. Examples of molar ratios of reactants (A), (B), and (C) which are contemplated as being useful in the monomer mixture include 1:0.6:0.4, 1:0.8:0.2, 1:0.9:0.1, 1:0.2:0.8, 1:0.1:0.9, and 1:0.3:0.4.

The polymerization of the three reactants is carried out by mixing and heating the reactants with or without a solvent or diluent in the presence of a small amount of a catalyst at a temperature of from about 25° C. to about 150° C., preferably from about 25° C. to about 100° C. Since the polymerization is exothermic, cooling may be required to maintain the reaction mixture at the desired temperature. It is often convenient to add one of the reactants to a mixture of the other two reactants in order to control the rate of the polymerization reaction. Generally, the vinyl ester and alkyl vinyl ether are mixed and added slowly to the fumarate-catalyst mixture.

The polymerization is carried out in the presence of a small amount of a catalyst such as an organic peroxide or azobis-isobutyronitrile. Organic peroxides such as benzoyl peroxide and chlorobenzoyl peroxide are especially useful. Generally, from about 0.01 to about 1.5% of the catalyst is used.

The reaction time will vary from about 1 to 30 hours depending on the temperature, the reactivity of the monomers, and other reaction conditions.

The exact nature of the terpolymer obtained by the process of this invention is not fully understood. It is observed, however, that the properties of the polymers are dependent on the choice of monomer ratios. Thus the composition of the terpolymer is controlled by such choice but the precise chemical composition remains unknown.

The terpolymers of this invention may be characterized by the specific viscosity of a solution of 5 grams of a terpolymer and 100 mls. of benzene at 30° C. It is well known that the specific viscosity of a polymer solution is an indication of the molecular weight of that polymer. The specific viscosity is defined by the formula $$\frac{\text{viscosity of the polymer solution}}{\text{viscosity of the pure solvent}} \text{ minus } 1$$

Solutions containing 5 grams of the terpolymers of this invention per 100 mls. of benzene are characterized by specific viscosities (at 30° C.) of from 0.090 to 0.800.

The following examples illustrate the methods of preparing the terpolymers of this invention.

Example 1

A mixture of 2340 parts (12 moles) of a commercial mixture of fatty alcohols consisting of 2% decyl alcohol, 65% of dodecyl alcohol, 26% of tetradecyl alcohol and 7% of hexadecyl alcohol, 300 parts of toluene, and 12.5 parts of para-toluenesulfonic acid is prepared and 696 parts (6 moles) of fumaric acid is added to the mixture. The esterfiication is accomplished by heating the mixture at reflux temperature for a period of 6 hours while removing the water as formed. Calcium hydroxide (30 parts) and 50 parts of a filter aid are added to the mixture which is heated to 110° C. for 1 hour and filtered. The filtrate is heated to 145° C./30 mm. to remove the volatile components. The residue is the desired dialkyl fumarate having a saponification number of 231 (theory, 238).

A mixture of 25 parts (0.3 mole) of vinyl acetate and 14 parts (0.2 mole) of ethyl vinyl ether is added dropwise to a mixture of 254 parts (0.5 mole) of the above-prepared dialkyl fumarate, warmed to 37° C., and 1.5 parts of azobisisobutyronitrile is added. The mixture is then heated to 85° C. and maintained at a temperature of from 60°–70° C. for 10 hours. The volatile components are removed by heating at 135° C./40 mm. The residue is the desired terpolymer having a specific viscosity in benzene solution of 0.295.

Example 2

A mixture of 34.4 parts (0.4 mole) of vinyl acetate in 7.2 parts (0.10 mole) of ethyl vinyl ether is added dropwise to 237 parts (0.5 mole) of a dialkyl fumarate prepared as in Example 1 (saponification number of 231) in an atmosphere of nitrogen at a temperature of from 41°–44° C. There is then added 1.4 parts of azobis-isobutyronitrile and some polymerization occurs after about 5 hours. After an additional 8 hours of heating 2 parts of chlorobenzyl peroxide is added and the reaction mixture maintained at a temperature of from 50°–60° C. for 8 hours. The mixture is heated to 165° C./20 mm. to remove any volatile material, a filter aid is added, and the mixture filtered at a temperature of 130° C. The filtrate is the desired terpolymer having a specific viscosity in benzene solution of 0.524.

Example 3

A mixture of 17.2 parts (0.2 mole) of vinyl acetate and 21.6 parts (0.3 mole) of ethyl vinyl ether is added over a period of 5 minutes to 237 parts (0.5 mole) of a dialkyl fumarate prepared as in Example 1 (saponification number 218) at a temperature of 28° C. There is then added 1.4 parts of azobisisobutyronitrile and the mixture is heated to 55°–60° C. The mixture is maintained at a temperature of from 55°–60° C. for 3 hours and filtered using a filter aid. The filtrate is the desired terpolymer having a specific viscosity in benzene solution of 0.358.

Example 4

A mixture of 8.6 parts (0.1 mole) of vinyl acetate and 28.8 parts (0.40 mole) of ethyl vinyl etehr is added dropwise to 237 parts (0.50 mole) of the dialkyl fumarate prepared in Example 2 at a temperature of 40° C. in an atmosphere of nitrogen. The reaction is slightly exothermic and the mixture is maintained at a temperature of 50°–60° C. for 15 hours. The mixture is then heated at 160° C./15 mm. to remove any volatile materials. A filter aid is added and the mixture filtered at a temperature of 82° C. The filtrate is the desired terpolymer having a specific viscosity in a benzene solution of 0.183.

Example 5

Vinyl acetate (40 parts, 0.46 mole) is added to 380 parts (0.75 mole) of a dialkyl fumarate prepared according to the procedure of Example 1 (saponification number of 236) at a temperature of 40°–42° C. followed by the addition of 22 parts (0.31 mole) of ethyl vinyl ether and 4.4 parts of benzoyl peroxide. The mixture is heated to 66° C. in 45 minutes and is maintained at that temperature for 6.5 hours. Mineral oil (221 parts) is then added and the solution is reheated to 66° C. and filtered. The filtrate is the desired terpolymer solution (33.3% oil) having a specific viscosity measured in benzene solution of 0.390.

Example 6

The procedure of Example 1 is repeated using 215 parts (0.5 mole) of a dialkyl fumarate prepared by reacting 1 mole of fumaric acid with 2 moles of a commercial mixture of fatty alcohols consisting of 2.5% decyl alcohol, 95.0% of dodecyl alcohol, and 2.5% of tetradecyl alcohol, 34.3 parts (0.3 mole) of vinyl butyrate, 14.4 parts (0.2 mole) of ethyl vinyl ether and 1.5 parts of benzoyl peroxide as catalyst.

Example 7

The procedure of Example 1 is repeated using 275 parts (0.5 mole) of a dialkyl fumarate mixture of fatty alcohols consisting of 4% dodecyl alcohol, 44% tetradecyl alcohol, 24% hexadecyl alcohol, and 28% octadecyl alcohol, 12.5 parts (0.15 mole) of vinyl acetate, 14 parts (0.2 mole) of ethyl vinyl ether, and 1.5 parts of benzoyl peroxide as the catalyst.

Example 8

A mixture of 71.1 parts (0.5 mole) of vinyl hexanoate and 36 parts (0.5 mole) of ethyl vinyl ether is added to 550 parts (1 mole) of the dialkyl fumarate prepared in Example 7 at a temperature of 30° C. over a period of 5 minutes. Benzoyl peroxide (1.4 parts) is added and the mixture is heated to 60° C. and maintained at this temperature for 8 hours. A filter aid (40 parts) is added to the mixture which is filtered. The filtrate is the desired terpolymer.

Example 9

The procedure of Example 8 is repeated except that 215 parts (0.5 mole, of di-dodecyl fumarate (prepared from fumaric acid and dodecyl alcohol according to the procedure in Example 1), 26 parts (0.3 mole) of vinyl acetate, and 10 parts (0.1 mole) of n-butyl vinyl ether are polymerized using 1.5 parts of benzoyl peroxide as catalyst.

Example 10

A terpolymer is prepared according to the procedure of Example 9 using 215 parts of di-dodecyl fumarate, 38.7 parts (0.45 mole) of vinyl acetate and 2.9 parts (0.05 mole) of methyl vinyl ether.

The terpolymers of this invention are oil-soluble and are therefore useful in lubricating oil compositions. The lubricating oil base may be a mineral, vegetable, or animal oil, or a synthetic oil such as dioctyl sebacate, di-nonyl adipate, polymerized cracked paraffin wax, alkylated diphenyl ethers, etc.

The ability of a small amount of the terpolymers of this invention to improve the flow of lubricating oils at low temperatures is illustrated by evaluating the oil solutions in the pour point test. The pour point tests are performed in accordance with ASTM method D97. In this test the sample is maintained at a temperature of 115° F. or lower for at least 24 hours prior to the test. The sample is then cooled to a temperature approximately 20° above the expected pour point and then the sample is examined at intervals of 5° F. The pour point is the lowest temperature at which the oil will pour or flow when the container is tilted.

The effectiveness of the terpolymers of this invention as pour point depressing agents in various base oils is illustrated in Table I.

The terpolymers of this invention are also useful to improve the viscosity index of lubricating oils. The Mid-Continent, straight distillate, solvent extracted, base oil used to determine the effectiveness of the terpolymers has an original viscosity index of 100. When as little as 0.08% of the product of Example 2 is added, the viscosity index is increased to a value of 110.

The amount of terpolymer to be added to the lubricant varies with the particular oil and the improvement desired. Thus, to improve the pour point characteristics, the terpolymer should be added at a concentration of from about 0.01% to about 3% by weight. Where the desired improvement is the viscosity index, larger amounts of the terpolymer, e.g., 5–15%, are utilized.

TABLE I.—POUR POINTS

| Terpolymer | Concentration (percent by weight) | ASTM Pour Point (° F.)a | | |
|---|---|---|---|---|
| | | Oil Ab | Oil Bb | Oil Cc |
| None | | −10 | +5 | 0 |
| Product of Example 1 | 0.08 | −25 | −15 | −15 |
| | 0.10 | −25 | −15 | −15 |
| | 0.25 | −30 | −25 | −15 |
| Product of Example 2 | 0.08 | −15 | | |
| Product of Example 3 | 0.08 | −20 | −15 | −15 |
| | 0.10 | −15 | −20 | −25 |
| | 0.25 | −25 | −25 | −20 |
| Product of Example 5 | 0.08 | −20 | −20 | −15 |
| | 0.10 | −25 | −20 | −25 |
| | 0.25 | −35 | −30 | −25 | a Pour point determined according to ASTM Procedure D97–57.
b Oils A and B are mixtures of Mid-Continent, solvent extracted neutral oils.
c Oil C is a Mid-Continent, solvent extracted 100, neutral oil.

Lubricating oil concentrates are also contemplated by this invention. Concentrates are those oil solutions containing larger amounts of the additives, e.g., from 10% to 80% by weight of the terpolymer. These concentrates can be diluted subsequently with additional lubricating oil in order to provide the desired concentration level.

Present-day lubricants seldom contain a single improving agent such as the terpolymer of this invention or a detergent, or a corrosion inhibitor. The performance characteristics expected from today's high quality motor oils, for example, generally require the use of two, three, or even more different improving agents. Thus, the terpolymer of this invention will often find use in lubricants which contain one or more additional improving agents such as corrosion inhibitors, detergents, extreme pressure additives, oiliness agents, antioxidants, and dispersants.

What is claimed is:

1. A terpolymer having a specific viscosity of from about 0.090 to 0.800 measured in a solution of 5 grams of terpolymer per 100 mls. of benzene at 30° C., prepared by the process of polymerizing at a temperature of from about 25° to 150° C., a mixture of
   (A) 1 mole of a dialkyl fumarate wherein the alkyl radicals contain from about 10 to 18 carbon atoms, and from about 0.5 to 1 mole of a mixture of
   (B) a vinyl ester of a fatty acid having from about 2 to 10 carbon atoms, and
   (C) an alkyl vinyl ether wherein the alkyl group contains from about 1 to 10 carbon atoms, the mole ratio of (B) to (C) in the mixture being within the range of from about 9:1 to 1:9.

2. The terpolymer of claim 1 wherein the vinyl ester of (B) is a vinyl ester of a fatty acid having from about 2 to 6 carbon atoms.

3. The terpolymer of claim 1 wherein the alkyl vinyl ether of (C) is ethyl vinyl ether.

4. The terpolymer of claim 1 wherein the alkyl radicals of the dialkyl fumarate contain from about 12 to 14 carbon atoms.

5. A terpolymer having a specific viscosity of from about 0.090 to 0.800 measured in a solution of 5 grams of terpolymer per 100 mls. of benzene at 30° C., prepared by the process of polymerizing at a temperature of from about 25° to 150° C., a mixture of
   (A) 1 mole of a dialkyl fumarate wherein the alkyl radicals contain from about 10 to 18 carbon atoms, and 1 mole of a mixture of
   (B) a vinyl ester of a fatty acid having from about 2 to 10 carbon atoms, and
   (C) an alkyl vinyl ether wherein the alkyl group contains from about 1 to 10 carbon atoms, the mole ratio of (B) to (C) in the mixture being within the range of from about 9:1 to 1:9.

6. The terpolymer of claim 5 wherein the vinyl ester of (B) is vinyl acetate.

7. The terpolymer of claim 5 characterized further in that the alkyl vinyl ether of (C) is ethyl vinyl ether.

8. The terpolymer of claim 5 wherein the mole ratio of (B) to (C) in the mixture is within the range of from about 4:1 to 1:4.

9. A terpolymer having a specific viscosity of about 0.3 measured in a solution of 5 grams of terpolymer per 100 mls. of benzene at 30° C., prepared by the process of polymerizing at a temperature of from about 25° to 150° C., a mixture of
   (A) 1 mole of a dialkyl fumarate wherein the alkyl radicals contain an average of from about 12 to 14 carbon atoms, and 1 mole of a mixture of
   (B) vinyl acetate, and
   (C) ethyl vinyl ether, the mole ratio of vinyl acetate to ethyl vinyl ether in the mixture being 3:2.

10. A terpolymer having a specific viscosity of about 0.5 measured in a solution of 5 grams of terpolymer per 100 mls. of benzene at 30° C., prepared by the process of polymerizing at a temperature of from about 25° to 150° C., a mixture of
    (A) 1 mole of a dialkyl fumarate wherein the alkyl radicals contain an average of from about 12 to 14 carbon atoms, and 1 mole of a mixture of
    (B) vinyl acetate, and
    (C) ethyl vinyl ether, the mole ratio of vinyl acetate to ethyl vinyl ether in the mixture being 4:1.

11. A terpolymer having a specific viscosity of about 0.18 measured in a solution of 5 grams of terpolymer per 100 mls. of benzene at 30° C., prepared by the process of polymerizing at a temperature of from about 25° to 150° C., a mixture of
    (A) 1 mole of a dialkyl fumarate wherein the alkyl radicals contain an average of from about 12 to 14 carbon atoms, and 1 mole of a mixture of
    (B) vinyl acetate, and
    (C) ethyl vinyl ether, the mole ratio of vinyl acetate to ethyl vinyl ether in the mixture being 1:4.

12. A lubricating composition comprising a major proportion of a lubricating oil and from about 0.01% to about 15% of the terpolymer of claim 1.

13. A lubricating composition comprising a major proportion of a lubricating oil and from about 0.01% to about 15% of a terpolymer of claim 5.

14. A lubricating composition comprising a major proportion of a lubricating oil and from about 0.01% to about 15% of the terpolymer of claim 9.

References Cited by the Examiner
UNITED STATES PATENTS

| | | | |
|---|---|---|---|
| 2,677,662 | 5/1954 | Mikeska et al. | 252—56 |
| 2,704,277 | 3/1955 | Giammaria | 252—56 |
| 2,825,717 | 3/1958 | Cashman et al. | 252—56 X |
| 2,936,300 | 5/1960 | Tutwiler et al. | 252—56 X |
| 3,136,743 | 6/1964 | Conway et al. | 252—56 X |

DANIEL E. WYMAN, *Primary Examiner.*

W. H. CANNON, P. P. GARVIN, *Assistant Examiners.*